Feb. 10, 1970  A. FENER  3,494,816
HEAT-SEALING APPARATUS FOR THERMOPLASTIC FILMS, CONTROLLED
BY TEMPERATURE ATTAINED BY THE WORK FOR THE HEATING
ELEMENT AND THE RESIDUAL HEAT OF ITS ENVIRONMENT
Filed Oct. 24, 1968
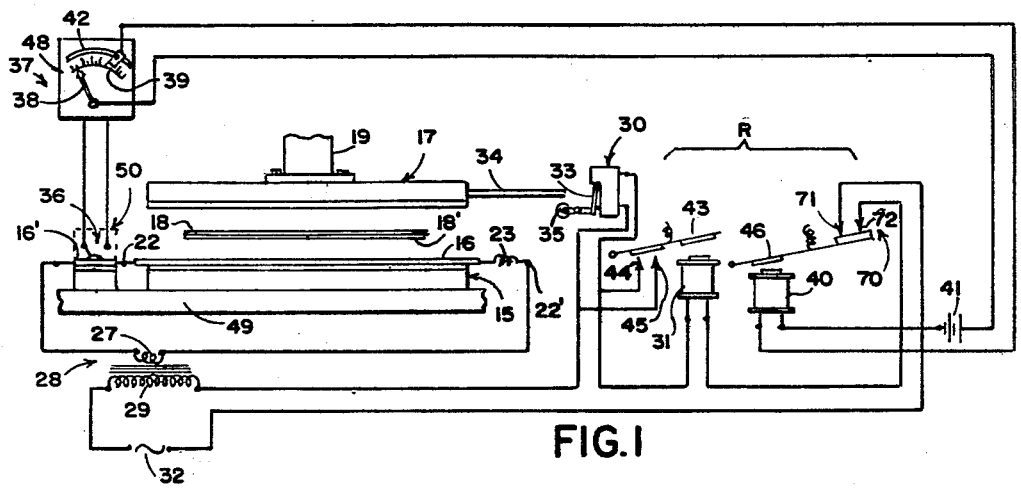
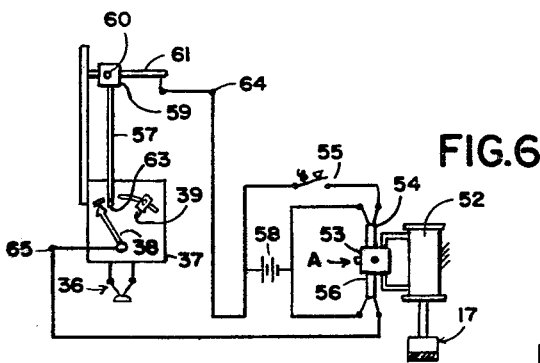
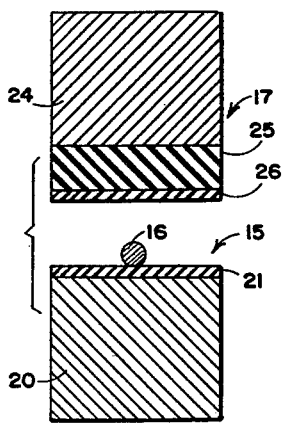
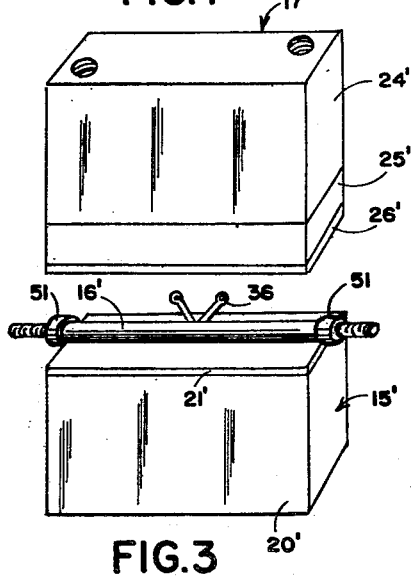
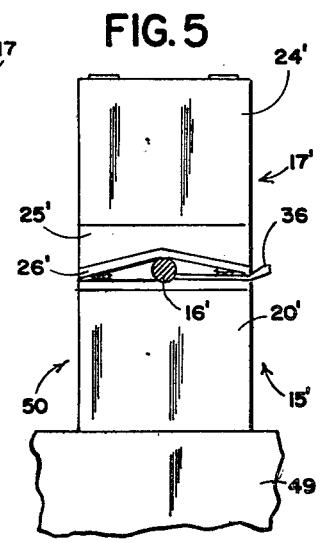
INVENTOR,
Alfred Fener
BY
ATTORNEY.

United States Patent Office 3,494,816
Patented Feb. 10, 1970

3,494,816
HEAT-SEALING APPARATUS FOR THERMO-
PLASTIC FILMS, CONTROLLED BY THE
TEMPERATURE ATTAINED BY THE WORK
FROM THE HEATING ELEMENT AND THE
RESIDUAL HEAT OF ITS ENVIRONMENT
Alfred Fener, 422 Beach 146th St.,
Neponsit, New York, N.Y.
Continuation-in-part of application Ser. No. 515,923,
Dec. 23, 1965. This application Oct. 24, 1968, Ser.
No. 770,368
Int. Cl. B32b 31/20
U.S. Cl. 156—359                            6 Claims

ABSTRACT OF THE DISCLOSURE

A short length of heating wire stock, associated to actuate a thermocouple, is mounted on a structure which simulates the sealing and pressure members of the apparatus, thus achieving a sample in substantially the same environment the main heating element is in. The sample heating wire and the heating wire of the apparatus, are connected in series so the same current passes through both of them when the heating circuit is closed by a switching means. A second switching means is arranged to open the heating circuit when the work reaches a predetermined temperature determined by the thermocouple. Also shown is a third switching device of which a movable member of the second switching device is a part, useful to effect release of the pressure bar in an automatic heat-sealing apparatus at a prescribed time, or is useful to operate a signal when the pressure is to be relieved by the operator in a manually operated apparatus, or to control any collateral circuit.

This is a continuation-in-part of application filed under Ser. No. 515,923 on Dec. 23, 1965, which is now abandoned.

The present invention relates to electrical heat-sealing apparatus of the thermal impulse type including a sealing member, a pressure member and reciprocating means for said members to apply pressure on layers of thermoplastic film interposed between them. The sealing member includes a heating wire to accomplish the seam and may be further employed as is well known, to sever the work. More particularly, this invention concerns the control of the heating circuit.

Heretofore, in apparatus of this class, the flow of current in the heating wire was time-controlled. But the fusion of the work plies is determined by temperature. In the time-controlled system, residual heat building up in the sealing and pressure bars, effected seam quality, and such residual heat being of fluctuating character, brought on non-uniformity in seam structure during a run of work. Operators would try to compensate for this by making adjustments to lower the current, or to tamper with the timer. Some work during a run was spoiled. Uniformity of machine performance could not be attained.

It is therefore an object of this invention to provide a heat-sealing apparatus of the class mentioned, in which the current flow through the heating wire ceases when the heat imposed on the work reaches a prescribed temperature. That is, instead of the heating circuit being time-controlled as was the practice heretofore, the present invention makes it temperature-controlled.

The heat-sealing apparatus employs a heating wire which is straight, and for different kinds of work, the sealing wires are bent in predetermined shapes and contours. These sealing or heating wires as they are interchangeably called, are mounted on individual bases, and as units are interchangeable on the machine. Each of said units provides its own terminals for connection in the heating circuit.

For the practice of this invention, a thermocouple controls switch means to open the heating circuit. For each of the heating wire units to carry its own thermocouple, would be impractical and of precarious association, because the assembly of a thermocouple onto a heating wire is a delicate connection which would easily become disrupted by handling of the units and the repeated impacts of the pressure bar with the sealing bar.

It is therefore another important object of this invention to provide the heat-sealing apparatus with a single thermocouple structure, which instead of being on every heating unit, is a part of the permanent equipment of said apparatus, securely associated therewith and safely positioned against damage, to serve in conjunction with any heating unit that may be mounted on the apparatus, and be appropriate therefor, functioning in such manner as if the thermocouple were directly physically mounted on the heating wire of the unit.

Another object of this invention is to provide a thermal impulse heat-sealing apparatus whose heating means is temperature-controlled, which is reasonable in cost and efficient in carrying out the purposes for which it is designed.

Other objects and advantages will become apparent as this disclosure proceeds.

For the practice of this invention, it is preferred that all heating wires and their assemblies as units which are interchangeable on the apparatus, shall be of identical cross section and made up of the same stock materials, so that current consumption per unit of length of heating wire shall be the same, and so that residual heat occurring in per unit of length of structure shall be the same, for all practical purposes.

For one practice of this invention, a short length of the heating wire stock, associate to actuate a thermocouple, is mounted on a structure which simulates the sealing and pressure members of the apparatus, thus achieving a sample in substantially the same environment the main heating element is in. This comparatively short piece of heating wire or tape as the case may be, is connected in series with the comparatively long heating wire or tape of the sealing bar of the apparatus, so the same current passes through both of them when the heating circuit is closed. There is one switching means to send current through the heating elements of the sealing bar and the sample thereof, and a second switching means to open the heating circuit when the work reaches a predetermined temperature.

Also shown is a third switching device of which a moveable member of the second switching device is a part, useful to effect the release of the pressure bar in an automatic heat-sealing apparatus, after the seam has been made and has sufficiently cooled and set, or such third switching device can be used to operate a signal or lamp, when such pressure is to be relieved by the operator in a manually operated apparatus, or to control any collateral circuit.

In the accompanying drawing forming part of this specification, similar characters of reference indicate corresponding parts in all the views.

FIG. 1 is a diagrammatic view of a thermal impulse heat-sealing apparatus and one manner of mechanism and electrical circuits for its control, in accordance with the teachings of this invention.

FIG. 2 is a traverse section through the sealing and pressure bars of said apparatus; said bars being shown apart.

FIG. 3 is a perspective view of a sample sealing bar with its sample heating wire associated with a thermocouple.

FIG. 4 is a perspective view of a sample pressure bar.

FIG. 5 is an end view of the assembled sample unit. FIGS. 3–5 are shown enlarged.

FIG. 6 shows mechanism to operate the pressure member, controlled by a modification in structure of a switching means included in FIG. 1, to effect timely release of said pressure member from the work.

In the drawing, the numeral 15' designates generally a sample of the sealing bar 15 of an electrical heat-sealing apparatus of the thermal impulse type. The numeral 16' denotes a sample of the heating wire 16 which is part of the sealing bar 15. The numeral 17' designates generally a sample of the pressure bar of said apparatus. The pressure bar 17 is mounted for movement towards and away from the sealing bar, to apply pressure on thermoplastic films 18, 18' interposed between them to be seamed, that is, fused along the line of the heating wire 16. The means for carrying out such movement being indicated as including the member 19, which carries said pressure bar 17. For the principles of impulse sealing and for illustrative examples for sealing and pressure bar constructions, reference may be had to my Patents 2,961,031 and 3,015,601.

In the embodiment herein illustrated to show one manner of construction and control, the sealing bar 15 comprises a metal base 20 which may, for example, be of brass or aluminum, having a thin layer 21 of substantially non-compressible heat-resistant insulation cemented thereon or otherwise suitably secured thereto. Upon this layer of insulation which may be of Fiberglas fabric impregnated with Teflon, there is tensioned between the terminals 22, 22', the elongated heating wire 16 of Nichrome, by interposition of a tension spring 23. The pressure bar 17, comprises a metal base 24, having a relatively thick layer 25 of a suitable elastomer, such as silicone rubber thereon, covered by a relatively thin layer 26 of Teflon-impregnated Fiberglas fabric, all cemented together or in other suitable manner assembled. It is to be noted that the parts of the samples are designated by the same numerals primed as the corresponding parts bear in the sealing and pressure bars.

For the practice of this invention, the wires 16 and 16' are connected in series across the terminals of the secondary winding 27 of a step-down transformer 28. The primary winding 29 of said transformer, is connected in series with a switch indicated generally by the numeral 30, an electromagnet 31, and a switch indicated generally by the numeral 70. The terminals of the unit comprising said components 29, 30, 31 and 70, are connected across the A.C. supply 32. Said switch 30 is of the type which is normally open, and will close momentarily upon movement of its operating member 33, open upon downward movement of the pressure bar 17 towards the sealing bar 15, as here arranged. An arm 34 extending from the pressure bar, contacts, pushes and passes when moving downwardly, the element 35 carried on the switch's operating member 33, thereby causing said switch to close momentarily. During upward movement of said arm 34, it contacts, swings upwardly and passes said element 35. But there is no movement of the switch's operating member 33, so said switch remains open. In the specific switch shown, the element 35 is free to swing upwardly from its normal rest position, but not downwardly from such position, and it is biased to its normal rest position. This micro-switch is a well known product in commerce. The switch 70 will be described in detail as this description continues.

A thermocouple 36, associated with the sample wire 16', to become activated by the heat in said wire sample, powers a galvanometer-type means 37, whose movable conductive pointer 38 when in contact with the adjustably positioned contact point 39, closes the circuit of an electro-magnet 40 which is powered by the current source 41. The contact point 39 is a conductive element insulated from the pointer 38, and is releasably fixed as a slide on the dielectric track 42.

The electro-magnet 31 has an armature 43 which is spring-biased to be away therefrom, but upon actuation of such magnet, said armature is attracted thereto, to connect the contact points 44 and 45, each of which is connected to one of the terminals of the micro-switch 30. The electro-magnet 40 has an armature 46 which is spring-biased to be away therefrom, but upon actuation of such magnet, said armature 46 is attracted thereto, to disconnect the points 71 and 72, that is, to open the normally closed switch 70, thus opening the circuit of the magnet 31, whereupon the armature 43 is released to return to its normal rest position away from the magnet 31.

The sample components 15', 16', 17', and the thermocouple 36 associated to be activated by the temperature in the sample wire 16', are assembled as a unitary bolted structure designated generally by the numeral 50, which is mounted on the bed 49 of the heat-sealing apparatus; the sealing bar 15, being also mounted on said bed, the micro-switch 30 is mounted on the apparatus so that its element 35 is intercepted by the arm 34 upon movement of the pressure bar 17. What may be called the relay device, designated generally by the letter R, may be mounted anywhere convenient on the frame of the apparatus, but the galvanometer means 37 is mounted so as to be accessible for adjusting the position of the slide 39 on the track 42, and to read the scale 48 to make note of such position. The position of the unit 50, should give no interference to the operator, or to the passage of work into and out of the apparatus.

The normal rest position of the apparatus, ready to receive the thermoplastic films 18, 18' to be seamed, is shown in FIG. 1, where all circuits are open, except that the terminals of the galvanometer means 37, are across the thermocouple 36, so if there is any residual heat in the unit 50, the arm of the needle pointer 38 will have advanced a bit towards the slide contact 39. But if the unit 50 is cold, said pointer will be at its "zero" position. After the operator has inserted the plies to be seamed in proper position atop the sealing bar 15, the pressure bar 17 is brought down to apply pressure on the work. During the descent of the pressure bar, the arm 34 will cause the micro-switch 30 to momentarily close, thereby closing the primary circuit of the transformer 28, whereupon current will flow in the secondary circuit, that is, through the wires 16 and 16', and the electro-magnet 31 in the primary circuit will become actuated and thereby attract the armature 43. Upon the attraction of said armature, the contact points 44 and 45 are connected. So though the micro-switch 30 is open after the arm 34 has passed the element 35, the primary circuit is maintained closed current continues to flow through the heating wires 16 and 16', until the temperature rises so that the output of the thermocouple 36 actuates the galvanometer means 37, to make the pointer 38 come into contact with the slide 39, whereupon the circuit of the electromagnet 40 is closed. This actuates said magnet 40 to attract the armature 46, whereupon the switch 70 is opened, thereby opening the primary circuit. Magnet 31 is thus de-energized, and hence the armature 43 will be caused to return to its normal rest position. This severs the connection between the contact points 44 and 45. Current flow ceases in the wires 16, 16', and they cool. The pressure on the work is continued a bit to allow the seam to congeal and set. Now the pressure bar 17 is raised to release the work. During the upward movement of the pressure bar, the arm 34 in passing the element 35, caused said element to swing up, and because of the latter being biased, to return to its normal rest position, without disturbing the open condition of the switch 30. This completes the cycle of operation, which may be repeated ad infinitum.

The term sample as used in this specification and in the appended claims, shall be deemed a piece which is substantially representative of the whole. Most practical and hence preferable, is to have the sample, a piece which is as if cut from the whole. This keeps the sample wire 16' in substantially the same environment that the main heating wire 16 is in. The temperatures of said wires, caused by current flow therethrough, are always identical, since the said wires are of the same stock. The temperatures of the respective masses offering residual heat, are always substantially identical. The resulting temperatures to which the work 18, 18', and the thermocouple 36, are respectively subjected to, are always substantially identical. Although there may not exist absolute precision identity in the respects mentioned, there is sufficient identity for all practical purposes, when the samples are as if cut off from the whole, meaning of whatever constructions the sealing and pressure bars may respectively be, so are the constructions of said sample components as to their makeup and in cross sectional size.

The samples may be representative of the whole and yet each component thereof may be in some definite fractional relationship thereto as to cross sectional size. However, if the thermocouple's performance in such instance, is indicative substantially to the temperature the work is being subjected to, the teachings of this invention are being practiced; such resulting temperature of the work, being caused by the combined heating efforts thereon by the wire 16, and the residual heat of the sealing and pressure bars 15 and 17.

Since the pressure member 17 is raised after the heating element 16 has cooled in order to allow the seal or seam effected to set while under pressure, the uncovering of the heating element can only minutely effect the identity of the environments of the heating elements 16, 16', and is for all practical purposes, negligible.

The Nichrome sample 16' may have brass or copper cap terminals 51 at its ends, for connecting it in the circuit. The scale 48 can be calibrated to indicate the setting of the slide 39, for work requiring different operational temperatures to accomplish a proper seam.

The system being temperature-controlled, the work done is uniform, not burnt or otherwise spoiled.

The apparatus shown, contemplates that operation of the pressure member 17, may be manually or by an automatic control means. For the latter, I refer to FIG. 6, which shows the pressure member 17, moved by a double-acting pneumatic cylinder 52, controlled by a well known solenoid-operated valve 53 which is supplied with compressed air at "A." Momentary closing of the circuit of the solenoid 54, by pressing the pushbutton switch 55, causes the pressure member to descend. Momentary closing of the circuit of the solenoid 56, causes the pressure member to rise. The conductive pointer 38, in conjunction with a swingable springy element 57, serves as a switch means to control the circuit of the solenoid 56; the source of power to actuate said solenoids, being indicated at 58. The components 58, 55 and 54, are connected in series. The components 58, 56 and the switch comprising the components 38, and 57, are connected in series; the terminals of such switch, being indicated at 64 and 65. The distal edge of the cantilever element 57, and a bit of the lower end lane of the left face thereof, are coated with a dielectric layer 63. Said element 57 extends in the path of the tip of the pointer 38, between the normal rest position of the pointer and the contact point 39. Said element is on a metallic slide 59, whose position is adjustable on the conductive track bar 61, by a set screw 60; said bar extending from a post 62 which is mounted on the casing of the instrument 37. Said element 57 has sufficient resiliency, with little vibratory tendency, to permit passage of the pointer, which first brushes the tip end of said element on the insulated left face thereof and then across the insulated distal edge, but on the return movement of said pointer, it will contact the uninsulated right face of said element and thus establish momentary contact therewith, to actuate the circuit of the solenoid 56, to raise the pressure bar 17, when the thermocouple 36 has cooled sufficiently to have the pressure released from the work; the position of the element 57 being adjusted on the rod 61, to get this proper timing to raise the pressure bar. This timing, it is to be noted, is by temperature change. It is evident that the circuit of the solenoid 56, is actuated on every alternate, even numbered, contact of the pointer 38 and the element 57.

In manually operated heat-sealing apparatus, the switch offered by the components 38 and 57, may be used to close the circuit of a bulb (not shown) or other signal device, or act as a switch in the circuit of any collateral device.

I claim:

1. A heat sealing apparatus comprising, in combination, a sealing member and a pressure member, mounted for cooperation with each other to apply pressure on layers of thermoplastic film interposed between them, and reciprocating means for said members; said sealing member comprising a predetermined base structure and an elongated heating element thereon in any desired formation, adapted to be heated by the passage of a current therethrough; said pressure member comprising a predetermined base structure including a layer thereon of a readily compressible elastomer which faces and is along said heating element when said sealing and pressure members are nearest one another, a sample of said sealing member; the sample heating element includes in said sealing member sample being connected in a common circuit with the heating element of the sealing member, a first normally open switching means operable to close to pass a current through said heating elements, a thermocouple associated with said sample heating element, to become activated by any heat occurring in said sample heating element, means holding said samples together as a unitary structure whereby the sample heating element and the thermocouple are in substantially the same character of physical environment as that the heating element of the sealing member is in when said sealing and pressure members are nearest one another, and a second switching means operated by said thermocouple to open the first switching means when the thermocouple is subjected to a predetermined temperature after said first switch means had been closed.

2. A heat sealing apparatus as defined in claim 1, wherein said unitary structure comprised of said samples and the thermocouple, is in fixed position away from the sealing and pressure members.

3. A heat sealing apparatus as defined in claim 2, wherein the sealing member is removably mounted on the apparatus and is replacable with others.

4. A heat sealing apparatus as defined in claim 1, wherein the makeup and the traverse section of the sample sealing member are substantially that of the sealing member, and the makeup and the traverse section of the sample pressure member are substantially that of the pressure member; the heating elements being connected in series.

5. A heat sealing apparatus as defined in claim 1, wherein the second switching means is adjustable to be operative to open the first switching means at different temperatures attained by the thermocouple.

6. A heat sealing apparatus as defined in claim 1, wherein the second switching means includes a member made to move from a normal rest position as the temperature of the thermocouple is increasing; such movable member returning towards its normal rest position as the temperature of the thermocouple is decreasing, and third switching means for controlling any other circuit, adapted to be closed by said movable member of the second switching means, as such movable member is returning towards its normal rest position and the temperature of the thermocouple has been reduced to a predetermined temperature.

References Cited

UNITED STATES PATENTS

| | | | |
|---|---|---|---|
| 2,719,567 | 10/1955 | Gardner | 156—359 |
| 3,113,198 | 12/1963 | Shinn | 219—494 |

SAMUEL FEINBERG, Primary Examiner

U.S. Cl. X.R.

156—368